Jan. 7, 1964     T. A. BRANDON     3,116,835
LUMBER SORTING AND ACCUMULATING MECHANISMS
Filed Oct. 14, 1959     7 Sheets-Sheet 1

Fig. 1.

INVENTOR.
THEODORE A. BRANDON
BY
Mathis and Graybeal
ATTORNEYS

Jan. 7, 1964 T. A. BRANDON 3,116,835
LUMBER SORTING AND ACCUMULATING MECHANISMS
Filed Oct. 14, 1959 7 Sheets-Sheet 2

INVENTOR.
THEODORE A. BRANDON
BY
Mattern and Graybeal
ATTORNEYS

Jan. 7, 1964 T. A. BRANDON 3,116,835
LUMBER SORTING AND ACCUMULATING MECHANISMS
Filed Oct. 14, 1959 7 Sheets-Sheet 4

INVENTOR.
THEODORE A. BRANDON
BY Mattis and Graybeal
ATTORNEYS

INVENTOR.
THEODORE A. BRANDON
BY
Mathis and Grayheal
ATTORNEYS

Jan. 7, 1964 T. A. BRANDON 3,116,835
LUMBER SORTING AND ACCUMULATING MECHANISMS
Filed Oct. 14, 1959 7 Sheets-Sheet 6

Fig. 17.

INVENTOR.
THEODORE A. BRANDON
BY
ATTORNEYS

United States Patent Office 3,116,835
Patented Jan. 7, 1964

3,116,835
LUMBER SORTING AND ACCUMULATING
MECHANISMS
Theodore A. Brandon, 1926 SE. Ash, Portland, Oreg.
Filed Oct. 14, 1959, Ser. No. 846,304
38 Claims. (Cl. 209—90)

The present invention relates to sorting and accumulating mechanisms for elongated units of random dimension and grade, by means of which such units are sorted as to classification or characteristic type, and more particularly relates to sorting and accumulating mechanisms for separating, segregating or classifying sawn lumber as to certain classification characteristics such as length, width, thickness, and grade, or any one or combination of these characteristics, as desired. Certain forms of the invention also simply and effectively provide commercially efficient classification as to lumber species.

Certain prior lumber sorting mechanisms involve relatively complex arrangements for selecting lumber units of particular size and/or grade, with varying degrees of complexity and reliability. Some such sorters accomplish sort with the lumber units conveyed on edge and/or endwise. Other sorter arrangements involve conveyance of the lumber units with a side or edge facing the direction of conveyance, and with sorting accomplished by a given size of lumber unit encountering a given placement of knock-off pin or the like. Other sorter segregation mechanisms involve various "gating" means for laterally moving or dropping a selected dimension of lumber unit from a path of travel at a predetermined point of sort.

Objects, features, characteristics and advantages of the present invention include provision of lumber sorting and accumulating mechanisms wherein constructionally simple and operationally reliable sorting elements of a wholly mechanical nature are employed; wherein the shortest and narrowest lumber units are sorted first, as distinguished from the common practice of sorting the longest and widest units first; wherein the lumber units being sorted are carried on their sides and are selected by superposed floating sorting arms, the overall constructional arrangement of the sorter mechanism being of relatively small vertical dimension; wherein the lumber dimension selecting sorter arms are recessed on their lumber contacting faces to select lumber units of corresponding width dimension and are arranged to select unit thickness by relative pivotal movement, the sorter mechanism also including grade position detection means operating to disable the sorting arms except at the desired point of sort associated with an allocated grade, the sorting mechanism also including reject position detection means operably associated with both said sorting arms and said grade position detection means to disable both when a lumber unit in the reject position is presented at a sorting station; wherein sorting is accomplished on a single line of conveyance of the lumber units being sorted and at a single sorting level with such sorting level being vertically quite compact; wherein reject lumber units after being preset to a predetermined lateral position pass through the entire sorting mechanism without any disruption of the sorting operation insofar as concerns non-reject lumber units; wherein sorter arms functioning to remove sorted lumber units from a line of conveyance at a point of sort are arranged to operate inboard of the ends of the lumber units sorted at that point; wherein the lumber units are conveyed through the sorter mechanism with an edge facing the direction of conveyance, i.e. with the lumber units resting flat on a side and with the sides disposed substantially horizontally; wherein the sorter mechanism includes lumber unit carrying hangers which are rearwardly open and which have flat lumber carrying surfaces so that no impediment to the removal of a lumber unit at a point of sort is presented and so that a given lumber unit can be removed from a given set of unit supporting hangers without any complicated manipulation of the lumber unit position, the lumber units moving from the hangers and dropping at a selected point of sort simply by sliding and falling off the hangers; and wherein sorting as to length and width is entirely automatic, and sorting as to grade is semi-automatic, the latter sort requiring operator participation only to the extent of a selected lateral offset related to grade of the lumber unit before the lumber unit reaches the sorter mechanism.

Other objects, features, characteristics and advantages pertaining particularly to certain various types of sorted lumber accumulator mechanisms characteristic of the invention include the provision of such mechanisms wherein a first battery of accumulators allocated to units of one species of lumber are simply and simultaneously brought into receiving position with respect to associated points of sort, and with another set or battery of accumulating mechanisms being alternately and simultaneously moved out of receiving position with respect to said points of sort; wherein certain of the accumulator mechanisms have semi-automatic or automatic means for interrupting and segregating the unit delivery thereto upon a predetermined number of units being delivered to the accumulator; wherein certain forms of accumulators stations incorporate arrangements and components assemblies minimizing any marring of the lumber units and obviating any necessity for close operator supervision, and provide advantageous operational simplicity in terms of ease of discharge, ease of reset and generally low labor requirement; and wherein certain other forms of sorter and accumulator arrangements provide wide flexibility of adjustment to adapt a given sorter section to select any desired unit dimension or grade.

These and other objects, features, characteristics and advantages pertaining to and inherent in the present invention will be apparent from the following description of certain typical and therefore non-limitative embodiments thereof, and as illustrated in the accompanying drawings, wherein like numerals refer to like parts and wherein.

Figure 1:
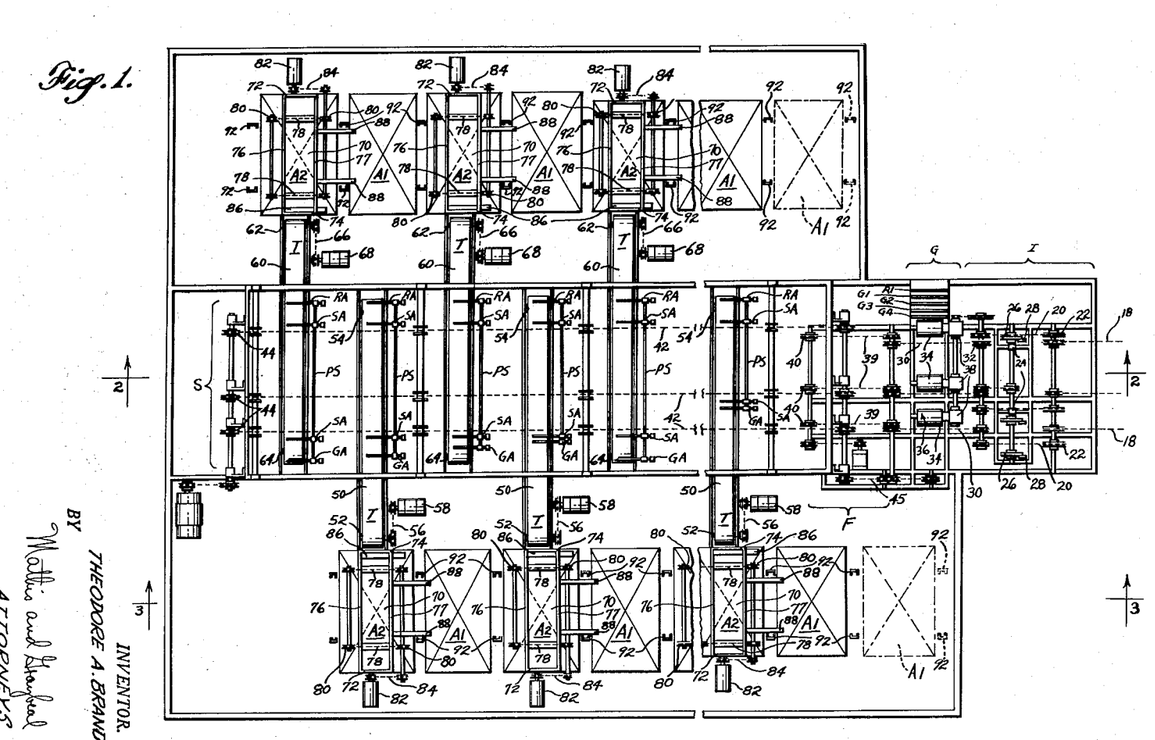
FIG. 1 is a somewhat simplified, fragmentary plan view, with certain assemblies shown somewhat diagrammatically, showing the overall layout of a sorter stage and associated batteries of accumulators embodying several features of the present invention.
Figure 2:
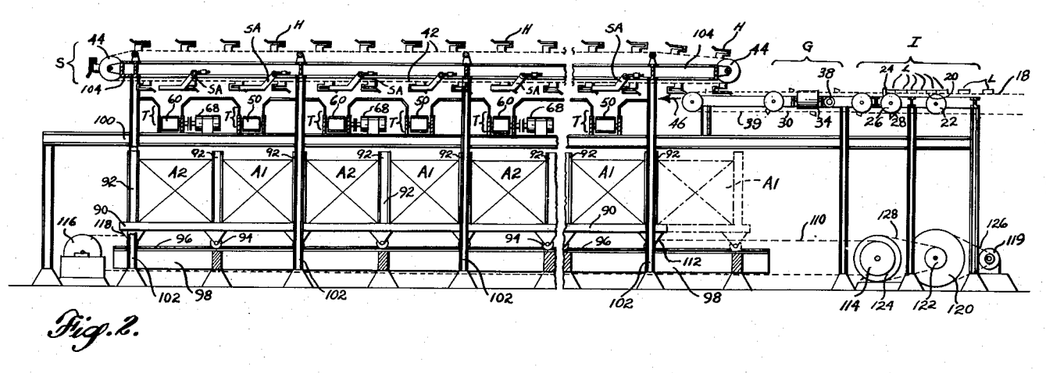
FIG. 2 is a view in longitudinal and vertical cross-section of the layout shown in FIG. 1, taken substantially at the center of the sorter mechanism, substantially along line 2—2 of FIG. 1.
Figure 3:
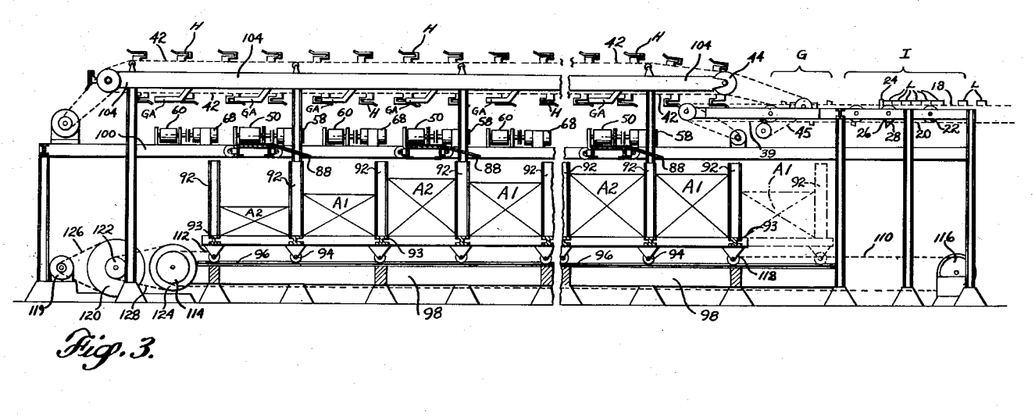
FIG. 3 is a further view in vertical and longitudinal cross section of the layout shown in FIG. 1 taken through the center of one of the sets of accumulators thereof, substantially along line 3—3 and showing certain further accumulator detail.

The mechanism layout illustrated in FIGS. 1, 2 and 3 in general comprises an infeed conveyor and spacer stage I, a grade positioning deck or stage G, a fast infeed conveyor stage F, a sorting stage S, a series of transfer conveyor stages T, and alternate series of accumulator sections or bins A1 and A2, accumulator sections A1 being allocated to accumulation of a given species of lumber units, and accumulator sections A2 being allocated to accumulation of another species of lumber units.

Also considered generally, each of the sorting sections in the sorting stage S comprises a laterally arranged set of sorting arms SA, a grade arm designated GA, and a reject arm designated RA, all of said arms being arranged on a common pivot shaft PS, also termable a rocker shaft. Operating in conjunction with the sorting sections of the sorting stage S are a series of rearwardly facing sets of hanger elements, certain of which have been generally designated at H.

In general terms, the various sorting arms SA represent what may be termed unit selector means, or selector hooks, or unit pull-off means or catchers, in that they serve to selectively remove a lumber unit L from a hanger H at the appropriate point of sort. In corresponding general terms, grade arms GA and reject arms RA represent what may be termed unit actuated disabling means, or selector disabling means, or selector deactuators, or unit end position gaging or detecting means, in that they serve to disable or deactuate the associated unit selectors whenever lifted by (i.e. gauging the end of) a lumber unit L.

Infeed conveyor and spacer stage I is fed by lumber supply conveyor means, such as chains 18, and is suitably but not necessarily of a type incorporating a set of ganged conveyor chains 20 and associated sprockets 22 delivering side supported lumber units L against fixed stops 24, said fixed stops 24 having associated therewith a set of lift wheels 26 each mounting an adjustably offset lift cam 28, the operation of which is such than an oncoming lumber unit L is elevated over fixed stops 24 by lift cams 28 for each revolution of lift wheels 26. This type of lumber unit feeding and spacing mechanism is known per se and disclosed in copending U.S. Patent No. 3,031,-061, issued April 24, 1962.

Spaced lumber units L are discharged from conveyor chains 20 at the outfeed end of the infeed conveyor and spacer stage I onto a set of short, lugged conveyor chains 30 transiting grade positioning stage G, the sprockets carrying chains 30 being designated at 32. Chains 30 are driven at a comparatively slow speed, say 60 feet per minute, for example. During transit of a given lumber unit L through the grade positioning stage G, an operator in view of the grade positioning stage G selectively causes one of grade bumpers G1, G2, G3 or G4 to raise, depending upon what grade of lumber he assigns to the particular lumber unit L in the grade positioning stage G. Driven rollers 34 are rotated in the direction indicated at 36 from a common drive assembly 38, the upper surfaces of said rollers 34 being just slightly above the feed level of chains 30, with a resulting lateral displacement of the lumber unit L in the grade positioning stage G to a position with the right hand end of the lumber unit L, as viewed from the infeed end of the equipment, against whichever grade bumper G1–G4 is in raised position. If no grade bumper G1–G4 is raised, the lumber unit L moves laterally to contact fixed reject bumper R1. As will be recognized by those skilled in the art, such a grade positioning stage is generally known per se, a similar positioning arrangement being disclosed in Johanson U.S. Patent No. 1,349,836, for example.

With each oncoming lumber unit L laterally positioned in grade positioning stage G as to its grade, the lumber units L are then successively discharged in spaced relation from said grade positioning stage G onto the fast infeed conveyor section F. Fast infeed conveyor section F comprises a set of slick (non-lugged) conveyor chains 39 and associated sprockets 40, driven at a relatively rapid speed, say 180 feet per minute, for example. The function of fast infeed conveyor section F is essentially to deliver each successive lumber unit L into supported position on an associated set of hangers H of the sorting stage S, as more fully explained hereinafter.

Lumber unit supporting hangers H are mounted in laterally spaced sets on conveyor chains 42 coursing the sorting stage S, the associated sprockets being designated at 44. In the layout illustrated in FIGS. 1–4, each set of hangers H includes three such hanger elements, by way of example. The speed of conveyor chains 42 is comparatively slow with respect to the speed of chains 39 in the fast infeed conveyor section F, and chains 42 must travel at the same rate of speed as chains 30, say at about 60 feet per minute, for example, the lugs on chains 30 being maintained in synchronism with the hangers H on chains 42. To accomplish the necessary synchronization of chains 42 and chains 30, the drive of said conveyor chains 42 is derived from drive mechanism interlocked and common with the drive of chains 30 in the section G, such common drive chain being indicated at 45. The direction of drive of chains 42 is as indicated at 46, the hangers H when proceeding along the lower course of their cycle of travel having the open ends thereof facing rearwardly. As will be observed particularly with respect to FIGS. 2 and 3, for example, the fast feed of fast conveyor section F and the relative extent thereof are arranged so that a given lumber unit L when delivered by said fast conveyor section F passes into the rearwardly facing openings of the set of hangers H then just beginning a lower course of travel through the sorter stage S. Because of the overlap of conveyor chains 39 in section F and conveyor chains 42 in the sorter stage S, the fast drive of the oncoming lumber unit L is maintained until the lumber unit L is nested into and substantially against the forward wall of the associated set of hangers H, after which said chains 38 drop away leaving the lumber unit L deposited in proper position on the set of hangers H.

Specific construction of the hangers H is discussed below with particular reference to FIG. 14, the layout and sequential arrangement of grade arms GA and sorting arms SA as well as the reject arms RA are discussed in detail in connection with the layout of FIG. 4, and the constructional detail and arrangement of grade arms GA, the sorting arms SA and the reject arms RA are discussed below in connection with the presentations at FIGS. 5 through 12.

Outfeed of the various lumber units L from the sorting stage S occurs at various drop-off stations or points of sort related to an assigned size and grade of lumber unit, lumber of the narrowest width and shortest length being sorted first. With any giving sorting sequence the general assembly portrayed at FIGS. 1, 2 and 3 includes a series of transfer conveyor sections T, those transfer conveyor sections T delivering to the left as viewed from the infeed end of the assembly comprising conveyor belts 50 wove around drums 52 and 54, drum 52 in each instance being continuously driven through drive chain 56 from motor 58. Likewise those transfer conveyor sections T delivering to the right comprise conveyor belts 60 wove around pulleys or drums 62 and 64, drum 62 being continuously driven through drive chain 66 from motor 68.

The conveyor belts 50 and 60 each deliver to a secondary transfer conveyor, also to be considered as a part of each of the transfer conveyor sections generally designated at T. Such secondary transfer conveyor in each instance includes a receiving deck 70 situated at a level somewhat below the level of the conveyor belts 50 and 60, said receiving deck 70 being fenced at the ends, as designated at 72 and 74 and also by a closed fence at one side as designated at 76. The side fence 77 on the discharge side of receiving deck 70 is spaced substantially above conveyor chains 78 so that the units are discharged from the deck 70 only one at a time in the event several units have accumulated therein while delivery to the accumulator bin is interrupted for removal of an accumulated unit package. Takeoff of a lumber unit L from each receiving deck 70 is by means of a laterally spaced pair of lugged conveyor chains 78 passing around sprockets 80, one set of sprockets 80 being driven from motor 82 through drive chain 84, the direction of takeoff being away from side fence 76. Pivotally mounted take-off drive control switch plate 86 is depressed by a lumber unit as it comes to rest on receiving deck 70 and energizes the motor 82, the condition of drive of chains 78 continuing until the lumber unit leaves receiving deck 70 and is deposited on downwardly sloping discharge rails or skids 88, the lumber unit then dropping edgewise into the accumulator bin A1 or A2 situated therebelow. Also associated with the take-off from receiving deck 70 is a counter mechanism 89 (confer FIGS. 15 and 16) for each accumulator bin A1 and A2, of a type known per se, to maintain a running count of the number of units delivered to a given accumulator bin, the counter mechanism 89 also being in the take-off drive energization circuit to interrupt the drive of chains 78 when a number of units necessary to complete a "package" has been delivered to the bin. As will be evident, upon interruption of the take-off drive by the counting mechanism, any further lumber units delivered to receiving deck 70 remain there until the drive mechanism is reset, which is preferably done manually by the operator after removal of the accumulated package from the bin.

As previously indicated, the left hand and right hand sets of accumulator sections to which the transfer conveyor sections T discharge are arranged with alternately disposed accumulators designated A1, to receive lumber units of one species, and alternately disposed accumulators designated A2, to receive lumber units of another species. For purposes of the following discussion, the left hand and right hand series of accumulators are termed "sets," and the various accumulators designated A1 are termed the "A1 battery" with the various accumulators designated A2 being termed the "A2 battery."

Each such set of accumulators includes a series of bins or compartments arranged with common longitudinal beams 90 and with spaced upright posts 92 provided to give segregated accumulating areas, the whole structure being tied together by cross-beams 93 and being mounted on a series of pairs of wheels 94 engaging a spaced pair of rails 96 in turn supported by the foundation structure 98. The transfer conveyor sections T are supported over the sets of accumulators on beams 100 in turn supported intermediately on stationary columns 102 while the supporting beams 104 of the sorter stage S are supported above the transfer conveyor sections T at the top of columns 102.

Characteristic of one feature of the present invention, the mobile, ganged arrangement of each set of accumulators permits the accumulators of each set to be shifted in concert from the position thereof shown at FIG. 2 where accumulator sections A1 are in lumber unit receiving position under the discharge ends of the pairs of skids 88 to a position with accumulators A2 in lumber unit receiving positions under the discharge ends of skids 88 is accomplished by an accumulator transfer mechanism common to all accumulator sections of each set, each such accumulator transfer mechanism including a chain or cable 110 passing from an anchor means 112 at one end of a beam 90, around a drum or sprocket 114, thence around a drum or sprocket 116 to an anchor means designated 118 at the other end of the beam 90. The drive for such accumulator transfer is by selective energization of reversible motor 119 and reduction pulleys or sprockets 120, 122 and 124, and chains or belts 126 and 128. From the foregoing drive arrangement, it will be apparent that selected transfer of lumber unit delivery to or from either the A1 battery of accumulators or the A2 battery of accumulators is accomplishable simply by appropriate energization of reversible drive motor 119. Obviously, should it be desired to shift from one battery of accumulators to the other, both the left hand and right hand sets of accumulators are shifted, and the control means therefor can be independent for each set of accumulators or can be effected through synchronized control. As will also be apparent, though only two batteries of accumulators A1 and A2 are shown, further variations involving any plurality of batteries of accumulators can be incorporated into the arrangement. Thus, for example, accumulator sections can be arranged in an A1, A2, A3 sequence should three segregations as to lumber species or the like be desired in conjunction with a single sorting stage.

For purposes of typical illustration, the type of accumulator sections A1 and A2 illustrated in FIGS. 1, 2 and 3 is that type which merely involves an open bin or area where an operator attending a set of accumulators or a portion of a set of accumulators stacks the deposited lumber units into tiers by hand to form a so-called package to be removed by an overhead crane or the like. As further discussed in connection with certain modifications of the accumulator sections and arrangements presented below, the arrangement can employ any given type of accumulator, with the various accumulators of a given set moved en banc to simply and efficiently change the mechanism over for processing lumber units of another type.

Figure 4:
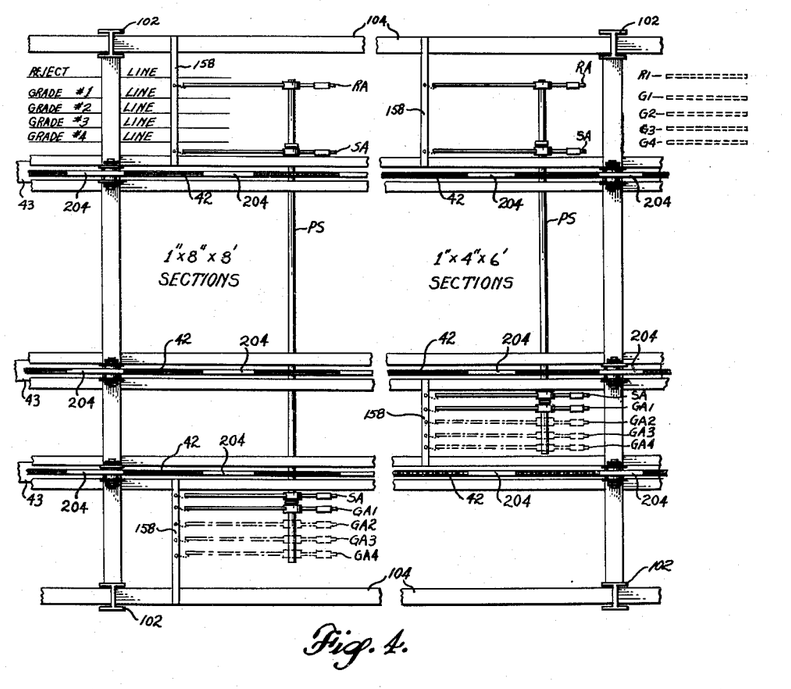
FIG. 4 is an enlarged fragmentary plan view to illustrate schematically certain of the considerations involving the layout of sorter arms, grade arms and reject arms and the basic mode of operation of the sorter mechanism in terms of typical sorting sequences.

FIG. 4 represents an enlarged fragmentary plan view of a somewhat schematic character and with certain elements superimposed for simplicity of illustration, showing some of the factors involved in the layout of the various sub-stages and specific sections of a typical sorter stage S. In terms of overall sorter stage layout, it is characteristic of a sorter stage of the present invention that narrower widths are sorted in sequence for a given length and that shorter lengths are sorted in sequence before longer lengths. Should thickness variations also be presented, it is also characteristic that the thicker units be sorted first. Further, with regard to capabilities of a given sorter stage S, such can have a specific section of sort allocated to a specific grade of lumber of a specific size, the sequence of grade sort within any given sub-stage depending on the extent of transverse offset allocated to any specific grade, with that grade most offset being sorted first. For purposes of illustration in this regard, concerning sort as to grade, the typical system presented by FIG. 4 sorts Grade #1 units first, the degree of transverse offset related to Grade #1 by grade lumber G1 being more than the degree of offset related to the other grades.

For clarity of description, each point of sort provided by a given set of sorting arms SA, reject arm RA, and associated grade arm GA is termed a "sort section," each sequence of sections devoted to separation of a given size lumber unit by grade is termed a "sub-stage," and the overall sorter line is termed the "sorter stage."

As evident from FIG. 1, each such sort section involves a laterally spaced set of floating sorting arms SA on a common pivot shaft PS, the assembly also including a floating reject arm RA spaced at the right and a floating grade arm GA spaced at the left. As also previously indicated, the infeed stages of the equipment include a grade positioning stage or deck G with a set of laterally spaced grade bumpers G1, G2, G3 and G4 and a fixed reject bumper R1, all shown schematically on FIG. 4, resulting in a lateral positioning of each successive lumber unit with the right hand end thereof traveling along a given grade line or reject line, as also shown schematically on FIG. 4.

It is typical practice in the lumber industry to precut lumber units to predetermined lengths on a trimmer stage before sorting of the lumber, such length typically being 6', 8', 10', 12', or more, for example, in increments of even footage. Operation of the grade sorting arrangement incorporated in the sorter stage of the present invention presupposes that the lumber units have been cut into such predetermined lengths prior to sorting.

Keeping in mind that complete layout of sorter sections and sorter sub-stages to make up a full sorter stage can involve many specific sorting sections, FIG. 4 for simplicity schematically portrays the makeup of but two sub-stages, the initial sub-stage comprising the sections for sorting lumber units which are 1" x 4" x 6' in dimension being shown, and a subsequent sub-stage picked at random and arranged for sorting lumber units which are 1" x 7" x 8' in dimension also being shown.

As viewed from the infeed end of the sorter stage, and taking the initial sub-stage for sorting various grades of 1" x 4" x 6' lumber units, the first section thereof comprises spaced sorter arms SA about 4' apart, a reject arm RA spaced at the right, and a grade arm GA1 to the left and shown in solid line, this initial section being portrayed in the right hand portion of FIG. 4. Sorting arms SA of this section and all of the sections in the initial sub-stage are recessed to receive only lumber units of 4" width, as discussed more fully hereinafter in connection with FIGS. 5-12. By such arrangement in the initial section (4" sorting arms SA, reject arm RA, and grade arm GA1), lumber units which are Grade #1 and of 1" x 4" x 6' dimension are removed from a set of hangers moving thereunder.

With further reference to the layout of the initial sub-stage of the sorting stage S in part portrayed at FIG. 4, the section next following the initial section has a pair of 4" sorting arms SA and a reject arm RA arranged exactly as in the initial section, but with a grade arm GA2 shown in the position indicated by dotted line and so designated. Similarly, the next following section of the sub-stage has 4" sorting arms SA and a reject arm RA alined with the sorting arms and reject arms of the two preceding sections, but with a grade arm GA3 in the position shown in dotted line and so designated. Again similarly, the fourth and last section of the initial sub-stage involves sorting arms SA and reject arm RA in the same lateral position as before, with the grade arm GA4 further offset to the left as shown in dotted line and so designated.

Sequentially, the development of the sorter stage S involves similar sub-stage layouts for progressively larger lumber unit dimensions, increased dimensions in sequence being first allocated to increasing dimensions as to width per a given length, then to increasing width dimensions for the next longer length, and so forth. Thus, by way of further example picked at random, a subsequent sub-stage involving grade sort as to lumber units of 1" x 8" x 8' dimension has an initial sort section with a layout of sorter arms SA, reject arm RA, and grade arm GA as shown in solid line in the left half of FIG. 4. The section immediately following such 1" x 8" x 8' grade #1 section is arranged for separating lumber units which are 1" x 8" x 8' and of Grade #2, and has sorter arms SA alined with the sorter arms of the initial section of this sub-stage, likewise a reject arm alined with the reject arms of this and the other sub-stages, and has a grade arm GA2 in the position there shown in dotted line and thus designated. As before, and in all the various sub-stages, the sections of the sub-stage progressively involve offset grade arms in the sequence GA1, GA2, GA3 and GA4, in the respective lateral positions shown, it being readily recognized in FIG. 4, and as has been indicated, the various grade arm designations GA1-GA4 are there shown in superimposed position, the actual layout involving succeeding sections which are identical except as to the extent of grade arm offset.

Having above noted the makeup of two typical sub-stages, it will be immediately evident that wide variation is possible as to the extent of sort and the ranges of lumber unit classification by dimension(s) and/or grade(s) to be accommodated by appropriate sorter stage layout. Thus, for example, a sorter stage designed to give a complete sort in four grades for all commercial lumber sizes between 1″ x 4″ x 6′ and 1″ x 12″ x 12′ would involve the following sorter sections in sequence:

1″ x 4″ x 6′ Grade #1, then Grade #2, then Grade #3, then Grade #4,
1″ x 6″ x 6′ Grade #1, then Grade #2, then Grade #3, then Grade #4,
1″ x 8″ x 6′ Grade #1, then Grade #2, then Grade #3, then Grade #4,
1″ x 10″ x 6′ Grade #1, then Grade #2, then Grade #3, then Grade #4,
1″ x 12″ x 6′ Grade #1, then Grade #2, then Grade #3, then Grade #4,
1″ x 4″ x 8′ Grade #1, then Grade #2, then Grade #3, then Grade #4,
1″ x 6″ x 8′ Grade #1, then Grade #2, then Grade #3, then Grade #4,
1″ x 8″ x 8′ Grade #1, then Grade #2, then Grade #3, then Grade #4,
1″ x 10″ x 8′ Grade #1, then Grade #2, then Grade #3, then Grade #4,
1″ x 12″ x 8′ Grade #1, then Grade #2, then Grade #3, then Grade #4,
1″ x 4″ x 10′ Grade #1, then Grade #2, then Grade #3, then Grade #4,
1″ x 6″ x 10′ Grade #1, then Grade #2, then Grade #3, then Grade #4,
1″ x 8″ x 10′ Grade #1, then Grade #2, then Grade #3, then Grade #4,
1″ x 10″ x 10′ Grade #1, then Grade #2, then Grade #3, then Grade #4,
1″ x 12″ x 10′ Grade #1, then Grade #2, then Grade #3, then Grade #4,
1″ x 4″ x 12′ Grade #1, then Grade #2, then Grade #3, then Grade #4,
1″ x 6″ x 12′ Grade #1, then Grade #2, then Grade #3, then Grade #4,
1″ x 8″ x 12′ Grade #1, then Grade #2, then Grade #3, then Grade #4,
1″ x 10″ x 12′ Grade #1, then Grade #2, then Grade #3, then Grade # 4,
1″ x 12″ x 12′ Grade #1, then Grade #2, then Grade #3, then Grade #4, and reject.

Any lumber unit which has been moved to the right in the grade positioning deck G to contact reject bumper R1 will raise each of the reject arms RA throughout the sorting stage S and pass therethrough without being sorted.

In essence, and as will be discussed in more detail below, any lumber unit presented to a given sorter section will not be selected by that section unless the left hand end of the lumber unit, as viewed from the aspect of FIG. 4, falls between the left hand sorter arm SA and the associated grade arm GA at that section, and unless the width of the lumber unit is of a dimension to be received in the recessed portion of the sorter arms SA, as more fully discussed below. Many other sorting sequences are possible, consistent with these considerations, and only a portion, or a more elaborate arrangement, of the above detailed sequencing will be readily perceived by those skilled in the art. Thus, by way of further example, to give greater simplicity in each sorting stage, it can be commercially feasible to restrict each sorting stage to lumber units of only one or two widths and/or lengths, with other sorting stages for other widths and/or lengths. Also, grade sort can be completely eliminated, in which case the disabling means termed "grade arms" in this description function simply to gauge unit length. Other adaptations where only a partial sort is made in a given sorting stage, or where a partial sort can be accomplished on a given sorter stage with the sections readjusted for further sort are possible, such as shown in more detail in connection with subsequently discussed FIGS. 17–20, for example.

As will be evident, the various grade arms GA and reject arms RA function to gauge one or more classification characteristics of each lumber unit (i.e. length and/or grade) by detection of the lumber unit end position. Correspondingly, by virtue of having recesses of predetermined dimension in the lumber contacting face thereof, the sorting arms SA function as selector means for another classification characteristic (i.e. width). In certain embodiments of the invention, such as that hereinafter discussed in connection with FIG. 14, the configuration and relative level of the lumber unit supporting surfaces of hanger elements H function also to gauge yet another classification characteristic of the lumber units (i.e. thickness).

Figure 5:
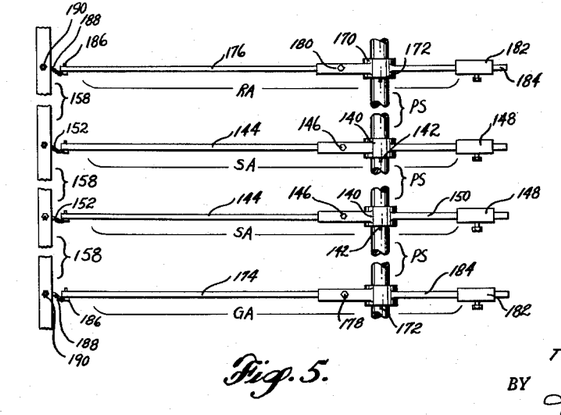
FIG. 5 is a fragmentary detail plan view on a further enlarged scale of a pair of sorting arms and the associated grade arm and reject arm typical of the shorting element assemblies employed in each section of the layout illustrated in FIGS. 1–4.
Figure 6:
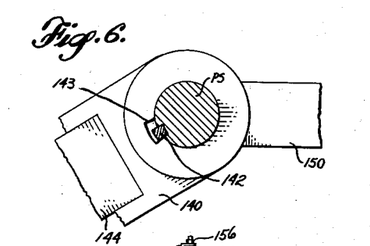
FIG. 6 is a further enlarged detail view in side elevation of the hub area of the sorting arms shown in FIG. 5.
Figure 7:
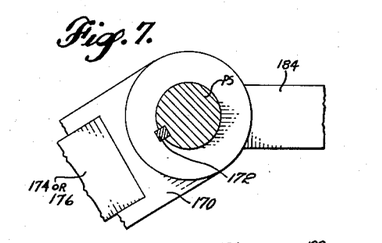
FIG. 7 is a further enlarged detail view in side elevation of the hub area of the grade and reject arms shown in FIG. 5.
Figures 8, 9, 10, 11, 12:
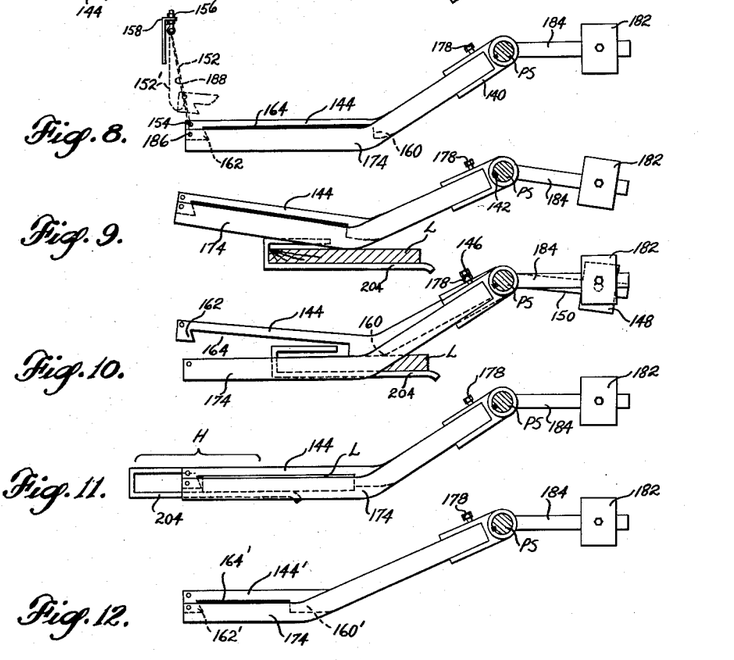
FIG. 8 is a view in side elevation of the sorter arms and grade arm shown in FIGS. 5, 6 and 7, showing the normal or "at rest" position thereof, and further showing fragmentally certain arm position retaining elements.
FIG. 9 is a further view in side elevation of the sorter arms and grade arm illustrated in FIGS. 5, 6 and 7, the view of FIG. 9 being the relation thereof when riding up or "floating" over a lumber unit, i.e. the position occurring when the grade arm disables the sorting arms.
FIG. 10 is a further view of the sorter arms and grade arm shown in FIGS. 5, 6 and 7, the relation thereof in the instance illustrated being that occurring when the lumber unit encounters the sorting arms but not the grade arm, the point of contact of the lumber unit with the sorter arms being about half way into a nesting position in the recesses of the sorter arms.
FIG. 11 is a further view of the grade arm, sorter arms and lumber unit as illustrated in FIG. 10, with the lumber unit advanced to a nesting position within the recesses of the sorter arms and with the removal of the lumber unit from the associated pair of unit conveying hangers having commenced.
FIG. 12 is a view in side elevation, similar to the view of FIG. 8, but showing the form of sorter arms having recesses adapted to nest with lumber units of a smaller width dimension.

FIGS. 5 through 12 present enlarged scale detail views of the sorting arm, grade arm and reject arm arrangement found in each section of the sorting stage S. FIG. 5 shows a fragmentary plan view, FIGS. 6 and 7 show hub area detail as to the sorting arms (FIG. 6) and the grade and reject arms (FIG. 7), FIGS. 8–11 show operating sequence and floating action of the sorter arm and grade arm or reject arm combination, and FIG. 12 shows the detailed assembly with a pair of sorting arms with a smaller recess for receiving a narrower width lumber unit.

As shown in FIGS. 5 and 6, for example, each of the sorting arms SA comprises an arm holder 140 keyed by key 142 and key slot 143 for limited pivotal movement on pivot shaft PS, said arm holder 140 in each instance being designed to disengageably and adjustably receive a sorting bar 144 which is held in retained position in holder 140 by means of bolt 146, the holder 140 also being counterweighted by adjustable counterweight 148 on counterweight arm 150, the appropriate setting of said counterweight 148 on arm 150 being at a point where the sorting bar side of the sorting arm is just slightly heavier than the counterweight torque, a suitable degree of net weight on the bar side of the arm being about 1 or 2 pounds. The free end of each sorting bar 144 is adjustably retained at a normal level (as shown in solid line at FIG. 8) by suitable means such as a short length of chain or rope 152 anchored to the free end of the bar 144 as by pin 154, a slack position of said chain or rope 152 being shown in FIG. 8 at 152′. For adjustability, the upper end of chain or rope 152 leads to a shackle bolt 156 adjustable vertically on cross bar 158 on the framing of the assembly.

In normal position, the outer, free ends of sorting arms SA are maintained in substantially horizontal position intersecting the path of travel of the lumber units L by the associated chains or ropes 152, and are configured to present a shoe or skid corner 160 to each oncoming lumber unit L and also to have a depending hook, finger or catch 162 at the free end thereof, the space between said skid 160 and said hook 162 being termable a lumber unit receiving recess, such recess being in the area designated at 164. Said recess 164 is specifically dimensioned to be just slightly larger than the width of lumber allocated to the specific sorting section to which the sorting arms SA are assigned and in the sorting arm arrangements illustrated in FIGS. 5 and 8–11 is about 12″ to receive and nest over lumber units of 12″ width. As will be discussed in more detail in connection with FIG. 12, the dimension of said recess 164 can be varied as desired, or can be adjustable either by a sliding bar arrangement between skid 160 and finger 162 of the sorting bar 144, or by simple removal and replacement of a given sorting bar 144 with another sorting bar of the desired recess dimension.

As shown in FIG. 6, the arrangement of keying each sorting arm holder 140 to pivot shaft PS provides what may be termed a lost motion keying by means of enlarged key recess or slot 143 permitting the sorting arms SA to move upwardly a limited degree in riding over a given lumber unit L without moving or with less movement of the pivot shaft PS. Such lost motion is to permit operation of the sorting arms SA independently of the grade arm GA and reject arm RA and also permit movement of sorting arms SA independently of each other to a limited degree in the event one end of a given oncoming lumber unit L is slightly ahead of its other end.

In per se construction and operation, the grade arm GA and reject arm RA at each sorting section are identical and will accordingly be described together, it being readily understood that arcuate pivotal movement upwardly of either the grade arm GA or the reject arm RA at a given sorting section results in the sorting arms SA also being pivotally moved upwardly through the common pivot shaft PS, with the sorter arms SA being thereby disabled. In detail, as shown at FIG. 7, the grade arm GA and reject arm RA each have an arm holder 170 keyed in fixed position on pivot shaft PS by a key 172. In an identical manner as the sorter arm holders 140, said grade arm and reject arm holders 170 detachably and adjustably mount a respective grade bar 174 or reject bar 176 by means of respective bolts 178 and 180, and are counterweighted by counterweights 182 adjustably mounted on counterweight arms 184. Said counterweights 182 are properly adjustable in the same manner as counterweights 148 on the sorting arms SA to a position where the respective grade bar 174 and reject bar 176 are just slightly heavier and will tend to remain in a normal or at rest position, with the free ends thereof in a substantially horizontal position.

The primary function of said counterweights 148 and 182 is to minimize any drag of the sorting arms, grade arms and reject arms on the lumber units L passing thereunder, so as to not prematurely move or dislodge the lumber unit from the set of hangers H on which it is riding.

As in the case of the sorter arms SA, the free ends of the grade bar 174 and reject bar 176 are adjustably depended from cross bar 158 by means of pins 186, chains or ropes 188, and shackle bolts 190 so as to be adjustable to proper pivotal position of rest in the line of the oncoming lumber units L.

The normal or at rest position of the sorting arms SA and the grade arm GA is shown in solid line at FIG. 8, which positions continue as long as there is no lumber unit L in the sorting station. When a lumber unit L is entering the sorting station which is either too long or of a grade assigned to a subsequent station, the lumber unit L encounters both the sorting arms SA and the grade arm GA, in which event both are pivoted slightly clockwise and "float" over the lumber unit L, as shown at FIG. 9, the pivotal movement of the grade arm GA also lifting the sorting arms SA for a time so that the lumber unit L does not become nested in the recesses 164 of the sorting arms SA. When the left hand end of lumber unit L is at a transverse position to fall between the left hand sorting arm SA and the grade arm GA, the oncoming lumber unit L raises the sorting arms SA but not the grade arm GA, as shown at FIG. 10. In this latter condition, when the trailing edge of the lumber unit L clears skids 160 of the sorting arms SA, the sorting arms SA drop onto the lumber unit L and the fingers 162 of the sorting arms SA interrupt the movement of the lumber unit L, causing removal from the set of hangers H, with deposit of the lumber unit at the sorting station (also see FIG. 13). Such nesting of the sorting arms SA on the lumber unit L at a time just before removal of the lumber unit L from hangers H is illustrated at FIG. 11.

With respect to the sequence of events illustrated at FIGS. 10 and 11, the operational significance of the gap or recess 164 between skid 160 and finger 162 is also of importance to note. In the event the dimension of the recesses 164 of a set of sorting arms SA is greater than the width of the lumber unit L, nesting of the lumber unit L in the recesses can occur. However, in the event a lumber unit L of a width greater than the dimension of recesses 164 is presented, even should the lumber unit L be of proper length and grade to not cause raising of the associated grade arm GA, the lumber unit L is nevertheless not selected at that sorting section because the leading edge of the lumber unit L passes under fingers 162 before the trailing edge of the lumber unit L clears skids 160. This manner of unit width selection is achieved by a constructional feature of maximum simplicity in sorting arm detail and is made possible by the arrangement of the sorting sub-stages to first sort the narrower width lumber units of a given length.

The simplicity involved in constructional variation to adapt a set of sorting arms recesses 164 to a predetermined lumber unit width is illustrated at FIG. 12, where the sorting bar arm 144' is configured to provide a recess 164' having a dimension between the skid 160' and the finger 162' of 7" for example, to nest only on lumber units having a width of about 6" or less.

Figure 13:
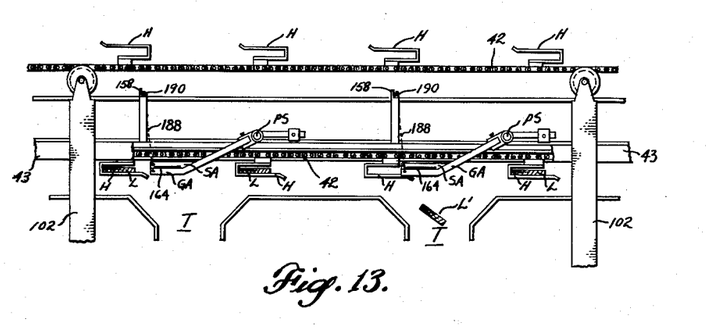
FIG. 13 is a fragmentary view in elevation and on an enlarged scale showing the sorter mechanism and associated transfer mechanism at two sort stations or points of sort, and with certain parts shown cross-sectionally, to further illustrate the nature of the sorting action.

FIG. 13 presents a view in side elevation and on an enlarged scale of a fragment of two sections of the sorter stage S and the upper portions the associated typical transfer sections T, showing more particularly the relative placement of the lumber unit receiving recesses of the sorting arms SA with respect to the transfer sections T, and showing further detail with respect to the sorting arm arrangements at each sorting section. As will be observable from an inspection of FIG. 13, a suitable placement of pivot shafts PS and the sorting arms SA as well as the grade arms GA and the reject arms (not shown in FIG. 13) provides that when a lumber unit L nests in the recesses of the sorting arms SA of a given sorting section, noting the section presented at the right hand in FIG. 13 for example, the removal of the lumber unit L from the associated set of hangers H occasions a drop off of the lumber unit L directly and substantially centrally over the transfer conveyor belt of the transfer section T, a lumber unit L at a moment of discharge being indicated in FIG. 13 at L'. As will also be evident, the disengagement of the lumber L' from first the associated set of hangers H and then from the recesses 164 of the sorting arms SA proceeds in a manner so that the trailing edge of the lumber unit L' drops away first, the leading edge but not the trailing edge of the unit L' being supported for a time by the set of hangers H, the unit L' then dropping completely clear of hangers H and sorting arms SA with a "peeling out" action, and without any abrupt or sharp impact on the lumber unit L' either during dislodgement from the hangers H or the sorting arms SA or upon its engaging the conveyor belt of the transfer sections T.

Figure 14:
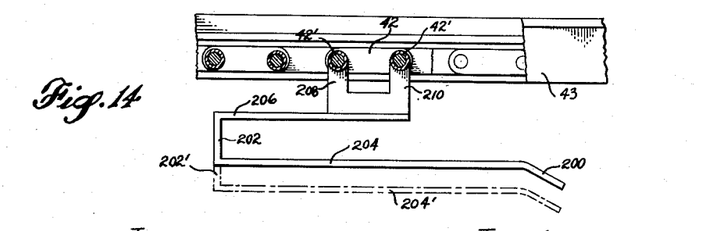
FIG. 14 is a detail view in cross section longitudinally of one conveyor chain, showing one of the lumber unit carrying hangers in depending relation on its associated conveyor chain, to illustrate certain dimensional considerations and dimensonal modifications thereof to adapt hangers to various lumber unit thicknesses.

FIG. 14 presents on a further enlarged scale and in fragmentary detail a side elevational view of one of the hanger elements H, to show the detailed construction thereof and certain constructional variations pertaining to same. Each hanger element H is in the form of an angular reverse bend open to the rear, preferably with a downwardly sloping free end portion 200, the reverse bend configuration providing an upright wall portion 202 as a leading edge against which the lumber unit is deposited by action of the fast infeed conveyor stage F. Lower bend portion 204 extends flat and substantially horizontally to provide support for the lumber unit being carried by the hangers. Upper bend portion 206 is preferably of a length to give a median point of balance to the hanger H, and spaced pairs of lugs 208 and 210 join upper bend portion 206 with a link of conveyor chain 42 of the sorter stage S, as by being welded to the barrels 42' of the link, chain race 43 maintaining the chain 42 and the lower surface of hanger H substantially level throughout the lower course of travel thereof through the sorting stage S.

The solid line configuration of hanger element H shown in FIG. 14 is designed to receive lumber units which are substantially 1″ in thickness, with a dimension between bend 204 and bend 206 of about 1½″. As will be readily evident, upright wall 202 can be extended as shown in dotted line at 202′ to place surface 204 in the dotted line position shown at 204′ to adapt the hanger to receive either 1″ or 2″ thickness lumber units, with such extension providing a dimension between bend 204′ and bend 206 of about 2½″, for example.

With respect to the simple variation and configuration of hanger elements H as just described, it is important to also observe that a sorting sequence characteristic of the present invention can be readily provided which can sort both units of 1″ thickness and units of 2″ thickness by arranging the various sub-stages for sorting out the units of 2″ thickness before the various sub-stages for sorting out the units of 1″ thickness. In such an arrangement, all of the sorting arms, grade arms and reject arms of the various sections assigned to select units of 2″ thickness are adjusted by means of the respective associated chains or ropes 152 and 183 to have a normal position slightly more than 1″ above the support level of the lower bends 204′ of the modified hanger elements. With such an arrangement, any lumber unit of 1″ thickness carried by the modified hanger elements simply passes under the various sorting arms and grade arms in the sections for selecting units of 2″ thickness without a floating action occurring and without any selection of 1″ thick units therein. However, with such an arrangement, any unit of 2″ thickness presented to the various sections with the sorting arms and grade arms so spaced will "float" in the characteristic manner and sorting of the 2″ thicknesses occurs in the appropriate 2″ sorting sections.

Figure 15:
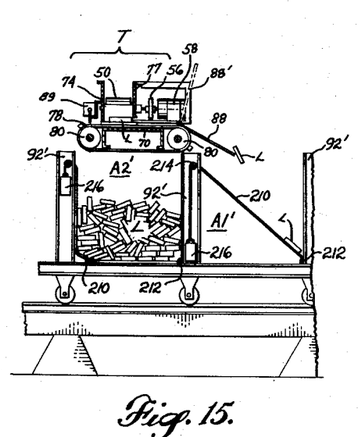
FIG. 15 is a somewhat simplified fragmentary view in side elevation of a modified form of another typical transfer mechanism and associated accumulator sections adaptable for use with and characteristic of the present invention.

FIG. 15 presents in simplified side elevational view a fragment of a set of another typical arrangement of accumulator sections adaptable for use in series and in battery in lieu of the accumulator arrangement illustrated in FIGS. 1–3. In this adaptation, the elements of the transfer section T (shown partly in section) are identical with the transfer section T shown in FIGS. 1–3 and the series of accumulator sections are arranged for movement in concert on a common wheeled carriage for simultaneously shifting from an A1′ section to an A2′ section, or vice versa, in like manner as the sections of each series shown in FIGS. 1–3. The accumulating area of each of the sections A1′ and A2′ shown in FIG. 15 have been modified over the A1 and A2 sections shown in FIGS. 1–3 to the extent of providing loaded drop cable supports to minimize the length of fall of the lumber units L delivered to each section. Such loaded drop cables in each instance comprise a laterally spaced length of cable 210 anchored at the bottom of the facing uprights 92′ by pins 212, which lengths of cable 210 pass over pulleys 214 to counterweights 216. The counterweights 216 keep the cables 210 taut at all times so that when a given accumulator section is empty or substantially empty, a lumber unit L discharging into it will first hit an open expanse of the tensioned cables 210 then slide down to a rest position against the facing uprights 92′. As the accumulator section proceeds to fill substantially, the weight of the lumber units L therein overcomes the weight of the counterweights 216 and the cables 210 yield progressively to a depressed position, such as shown in FIG. 13 in section A2′. Discharge skids 88 are pivotally movable to an up position as shown at 88′ to permit overhead access and withdrawal of a package from the unit receiving accumulator section.

Figure 16:
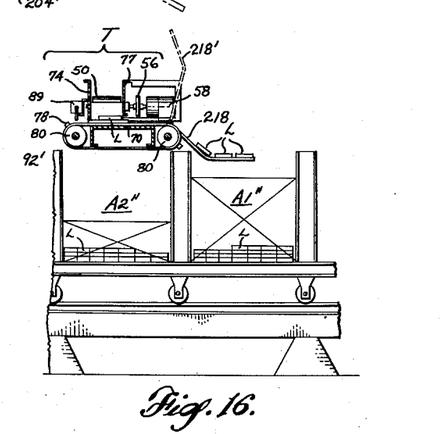
FIG. 16 is a fragmentary and somewhat simplified view in side elevation of yet another form of transfer mechanism and ganged accumulator sections, also characteristic of the invention.

FIG. 16 presents a further modified form of typical transfer and accumulator section used in the series and batteries illustrated in FIGS. 1–3. The accumulator sections A1″ and A2″ of this further modified form are of a type to be hand stacked by an attendant. In this form of transfer and accumulator mechanism as shown in FIG. 16, the discharge skids 218 are configured to extend substantially horizontally at the free ends thereof so that lumber units L discharging onto said skid 218 come to rest on the horizontal rail portions where they are available to be lifted off and stacked in tiers in the associated accumulator section A1″ by the attendant. As before the skids 218 are pivotably movable out of the way of overhead access, as shown at 218′. As in the earlier forms of the accumulator sections discussed, accumulator sections A1″ and A2″ are mounted on a common carriage for transfer as a set when shifting from one battery to another battery of accumulators when a different species of lumber is run.

FIGS. 17 through 20 relate to a modified form of sorting and accumulating assembly also characteristic of certain features of the invention and incorporating variations both as to the sorter stage arrangement and as to the accumulator section. One difference in the constructional arrangement of the modified form shown in FIGS. 17 through 20 is that the accumulator bins are located directly under the sorting sections, with the lumber units droppable directly into the bins instead of being transferred laterally by any transfer conveyor mechanism. Also, in this form of the invention, the accumulator sections are in fixed position. And, with respect to the sorting sections, the constructional arrangements thereof have been extended to give wide flexibility and possible alternation as to combinations for segregation of units by dimension, grade and/or species, with readily changeable grade arm and sorter arm combinations en banc at each sorter section.

Figure 17:
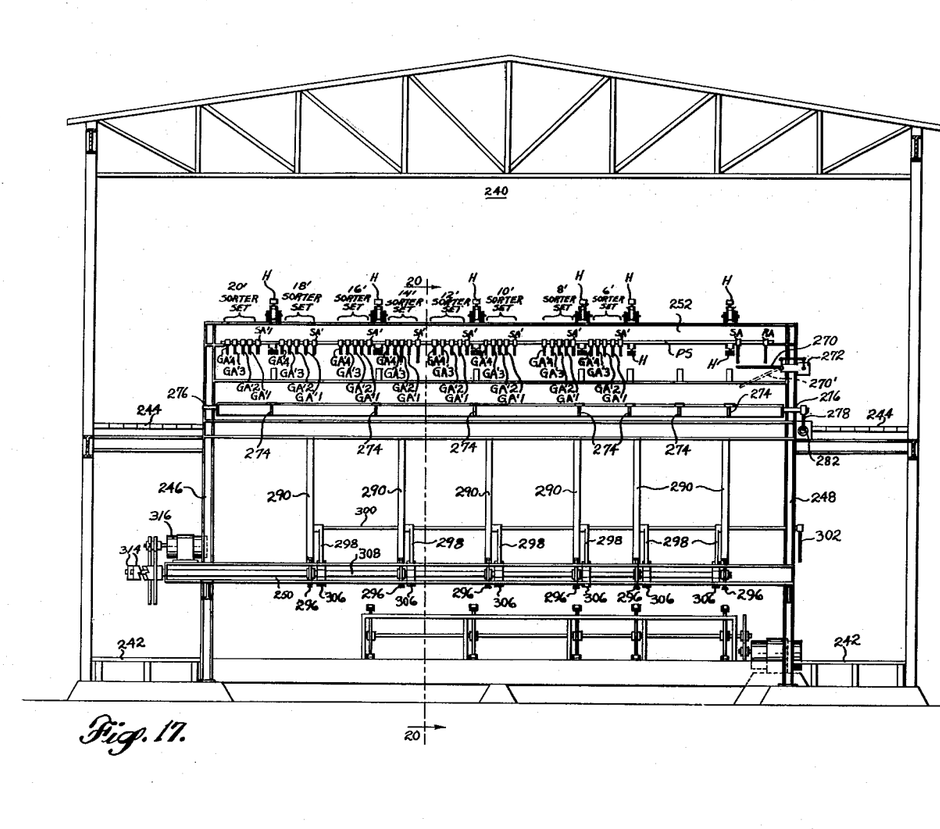
FIG. 17 is a view in transverse vertical cross section, and in a somewhat simplified form taken substantially along line 17—17 of FIG. 20, showing further modification of the sorter and accumulator mechanisms of the present invention, the sorter portion of the mechanism being of a type with selectively employed sets of grade arms and sorting arms pre-arranged and available at various unit lengths and grades for ready adaptability of a given sorting section to the sorting requirements of a particular run, and the accumulator sections of the mechanism being stationary and having power driven discharge means.
Figures 18, 19:
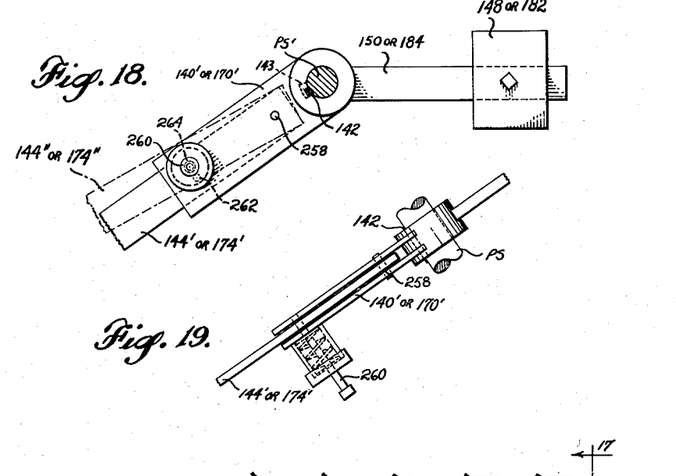
FIG. 18 is a fragmentary side view on an enlarged scale of the mounting construction for the various left-hand sorting arms and the grade arms employed in the sorting section assembly shown in FIG. 17 whereby the adjustment thereof to operative or non-operative position is readily accomplished.
FIG. 19 is a fragmentary plan view of the sorting arm and grade arm detail illustrated in FIG. 18.
Figure 20:
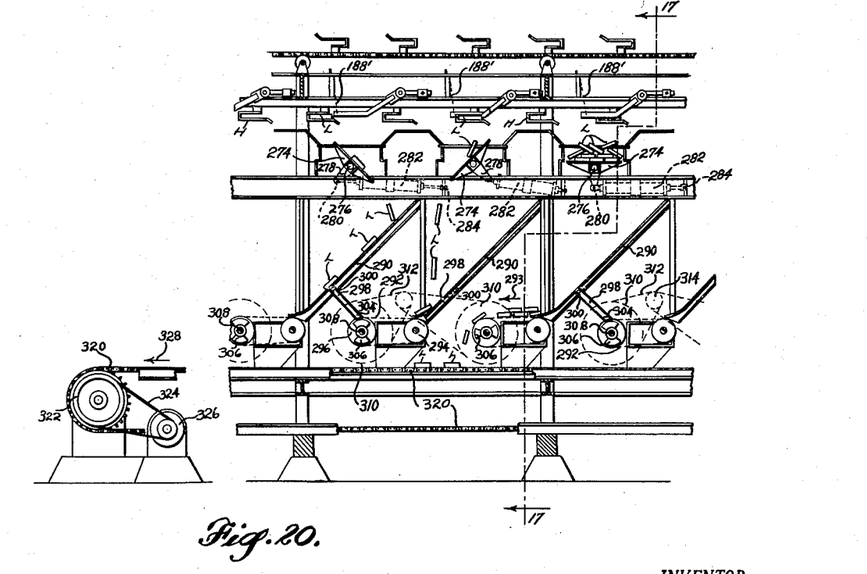
FIG. 20 is a fragmentary view in longitudinal and vertical cross section, taken substantially along line 20—20 of FIG. 17, showing a part of the sorter assembly and stationary accumulator sections employed in the modified form of the invention illustrated in FIG. 17.

In FIGS. 17 through 20, FIG. 17 presents a simplified transverse view in cross section substantially along line 17—17 through one of the sorter sections shown at FIG. 20, FIGS. 18 and 19 show detail as to the sorting arm and grade arm mountings, and FIG. 20 is a simplified view in longitudinal cross section substantially along line 20—20 of FIG. 17, showing the series arrangement of sorter sections and stationary accumulators characterizing this form of the invention.

In FIGS. 17–20, and unless otherwise indicated, the elements of the assembly are like elements of the earlier discussed assemblies and are indicated with like designation numerals.

For purposes of typical illustration, the assembly shown in FIGS. 15–18 is portrayed as housed in a two-story structure generally indicated at 240, with a lower floor level at 242 and an upper floor level at 244. Framing for the assembly includes columns 246 and 248 and lower and upper beaming 250 and 252.

Each sorter section of the sorter stage involves a common pivot shaft PS, a reject arm RA and a right hand sorter arm SA, the arrangement also including an array of combinations of alternatively used left hand sorter arms SA′ and grade arms GA′ at appropriate unit lengths. In the sorter section assembly shown at FIG. 17, such an array includes the combination of a sorter arm SA′ and four grade arms GA′1, GA′2, GA′3 and GA′4 all arranged in sets termable "sorter sets," with a set occurring at intervals of 6′, 8′, 10′, 12′, 14,′ 16′, 18′, and 20′ unit lengths, each such set being designed and intended for alternate use as necessary or appropriate for the particular sort desired at the associated sorting section.

A manner of use of the sorter section array shown in FIG. 17 is as follows. Assume, for example, that a given sorter section has sorter arms SA and SA′ with recesses for units of 10″ width and is to select lumber units which are of 1″ x 10″ x 14′ dimension, Grade #2. Then, the sorter section is adapted to such selection by enabling (i.e. dropping) the SA′ sorter arm and the GA′2 grade arm in the 14′ sorter set. Such adaptation is shown in FIG. 17. All other sorter arms SA′ and grade arms GA′ of this section remain disabled in such a setup. Assuming further that it is desired to shift a given sorter section from selection of one type of lumber unit to another type of lumber unit, the sorter arm SA' previously enabled and the grade arm GA' previously enabled are disabled and the appropriate other sorter arm or SA' as well as the appropriate other grade arm GA' are enabled. Thus, should one wish to shift from selection of 1" x 10" x 14', Grade #2, to selection of 1" x 10" x 10' Grade #4, for example, sorter arm SA' and grade arm GA'2 in the 14' set are disabled and sorter arm SA' as well as grade arm GA'4 in the 10' sorter set are enabled.

FIGS. 18 and 19 present fragmentary hub detail showing one manner by which the various sorting arms SA' and grade arms GA' can be readily enabled and disabled. Except for the sorting arm assemblies having the lost motion slot 143 (designated by dotted line in FIG. 18) the sorting arm and grade arm hub detail shown in FIGS. 18 and 19 is like the constructional detail involved in the sorter arm and grade arm forms SA and GA previously discussed in connection with FIGS. 6 and 7. Arm holder 140' or 170' of the sorting arm and grade arm assemblies mounts the sorting bar 144' or grade bar 174', as the case may be, in a manner permitting limited pivotal movement about pivot pin 258. The relative position of the bar 144' or 174' on holder 140' or 170' is adjustable by means of spring-loaded pull pin 260 mounted at one side of said holder 140' or 170' and readily engageable and disengageable with either of pin holes 262 and 264 in bar 144' or 174', the lower pin hole 262 when engaged by pin 260 placing the bar 144' or 174' in the enabled position shown by solid line in FIG. 18, and pin hole 264 when engaged by pin 260 placing the bar 144' or 174' in disabled or deactivated position as shown by dotted line in FIG. 18 and designated 144" or 174". By such construction, transfer of a given sorting arm SA' or grade arm GA' to or from an enabled position in the array shown in FIG. 17 is accomplished simply by manipulation of pull pin 260 and the dropping or raising of the bar 144' or 174', as the case may be. Alternatively, and as will be evident, the relative pivotal position of any of pivoted bars 144' or 174' can be adjusted to or from enabled position by adjustment of the associated free end support means therefor such as chain or rope 188' (noting FIG. 20).

With regard to the detail of the accumulator sections shown in FIG. 17 and also more particularly in FIG. 20, a given lumber unit L upon being dislodged from a set of hangers H at a point of sort first encounters and "triggers" a pivotally mounted board counting plate 270 which upon each deflection (as at 270') registers a unit count in a board counter 272 (note FIG. 17). Board counter 272 provides an indication to the operator of the number of units accumulated at each section and the discharge of accumulated units from any given section can be controlled manually, or is preferably controlled semiautomatically by the board counter 272 energizing a set of board receiving platforms 274 in a manner to interrupt the unit flow into the accumulator automatically upon the unit count reaching a predetermined number, such automatic interrupt and circuitry therefor being known per se in the art.

After triggering of the counter plate 270 a lumber unit L discharged from a sorter section next encounters the said set of pivotally movable platforms 274. The pivotal position of each set of platforms 274 is selectively maintained at any of three positions (as successively shown from left to right in FIG. 20) to first present a sloping surface to the discharging lumber unit and deliver same into the right hand area of the associated accumulating area as shown at the left in FIG. 20, or to next present a sloping surface to deliver the falling lumber unit into the more left hand area of the associated accumulating area as shown centrally in FIG. 20, or to then present a flat platform to the discharging lumber units and prevent the delivery thereof into the accumulating area until desired. Such three positions of the set of platforms 274 are accomplished by mounting the same for pivotal movement about bearings 276 and providing each with a lever arm 278 in turn connected to the free end 280 of a three-position, back-to-back air cylinder assembly 282, the other end of which is anchored to the framing as at 284. As will be observed from an inspection of FIG. 20, when hydraulic cylinder assembly 282 is energized to have both piston rods thereof extended, the set of platforms 274 is placed in the sloping position shown at the left. When hydraulic cylinder 282 is energized to retract both piston rods, the set of platforms 274 are transferred to the sloping position shown centrally in FIG. 20. When one piston rod is extended and one piston rod retracted in cylinder assembly 282, the level position of the set of platforms 274 is maintained, as shown at the right in FIG. 20.

A typical control arrangement for a set of platforms 274 can involve manual control of energization of assembly 282 to either sloping position by the operator to provide more even distribution of the accumulating load of units in the associated accumulator area, with control to the level position of said platforms 274 being initiated automatically upon board counter 272 reaching a predetermined unit count. The predetermined unit count assigned to any given accumulator section is preferably determined by the lumber units necessary to make up a kiln or stack "package" (usually 4' x 4') of the particular dimension of lumber unit being accumulated in that section.

The accumulating area in each accumulator section provided in the arrangement shown in FIGS. 17 and 20 comprises a laterally spaced series of sloping diagonal beams 290, the accumulating area in any given accumulating section being defined by the upper surface of one of said set of beams 290 at one side and at the other side by the lower surface of the next subsequent set of beams 290, the lower accumulating area including a set of short selectively operated conveyor chains 292 passing around sprockets 294 and 296, and a series of gate bars 298 ganged on a common shaft 300 in turn each provided at one end thereof with a manual reset lever 302.

Associated with the free ends 304 of each of the gate bars 298 is a segmented, preferably bifurcated latch cam 306 keyed to shaft 308 on which sprockets 296 of the driven conveyor chains 292 are also mounted. Operation of gate bars 298 and latch cams 306 to selectively discharge a given accumulator section is as follows. Each of the drive sprockets 310 for driving the shafts 308 is in turn driven from chain 312, double-action clutching 314 (FIG. 17) being provided so that one or the other of chains 312 is driven from sprockets 314 on the shaft of the associated motor 316. A motor 316 is thus provided for each pair of adjacent accumulator discharge mechanism, the operation of the equipment being such that very rarely is it necessary to discharge two adjacent accumulator sections at the same time and use of one motor 316 to drive the discharge mechanism for either of two adjacent sections reduces the motor requirement of the assembly by half as compared with an arrangement where each is separately motor driven. Clutching 314 is preferably manually controlled by the operator.

Further considering the manner of discharge of a given accumulator section shown in FIGS. 17 and 20, when a unit load (i.e. "package" count) has been accumulated in a given accumulator section, clutch 314 is engaged to start conveyor chains 292 and start rotation of latch cams 306 in that section. When latch cams 306 rotate to a point where cutaway portions thereof face the free ends 304 of gate bars 298, gate bars 298 fall clear of said latch cams 306 under the urging of the weight of the unit load in the sloped accumulating area, whereupon the accumulated units move progressively out of the accumulating area, sliding down the surfaces of beams 290 and moving into the opening left by movement of gate bars 298 under the further transfer force generated by the drive of conveyor chains 292, the arrangement of course being such that conveyor chains 292 move in the discharge direction indicated in one instance at 293. The open position of gate bars 298 during this discharge phase is shown in the central section illustrated in FIG. 20.

As a given accumulated unit load moves from its accumulator section, such passes on to a lower set of driven conveyor chains 320 coursing the entire set of accumulators, as by passing around sprockets 322 (the return sprockets not being shown in FIG. 20), the said sprockets 322 being driven by chain 324 from motor 326, the direction of delivery being indicated by arrow 328. The delivery point of conveyor chains 320 is to a stacking stage, which stacking can be done manually or by automatic equipment, as desired.

After discharge of a given unit load from a given accumulator section, and keeping in mind that in the meanwhile the associated set of platforms 274 has been maintained level and has interrupted the delivery of any further units into the accumulating area of that section, the rotation of latch cams 306 is stopped at a point where cutaway sections thereof face the arcs of movement of gate bars 298, at which point said gate bars 298 can be swung manually into the accumulating area by manipulation of lever 302, after which said latch cams 306 are "jogged" slightly to present raised cam segments to the ends 304 of gate bars 298, the bars 298 then being allowed to return to the closed, at rest position illustrated at the left and right in FIG. 20. After said gate bars 298 are thus closed (i.e. reset), a sloping position of the associated platforms 274 is again restored, and any lumber units which have accumulated in the meanwhile on the platforms 274 then discharge into the accumulating area, which manner of discharge will continue until the board counter 272 again registers an accumulated full load.

Considering the desirability of segregating partial sorts of one species of lumber from partial sorts of another species of lumber, it is to be noted that the sorting and accumulating arrangements presented in FIGS. 17–20 provide means by which such can be done simply and advantageously on an operational basis, even though the various accumulator sections of themselves are stationary. In this arrangement, segregation as to species can be simply accomplished by disabling the alternate sorter section arrays when running lumber of one species, then disabling the other alternate sorter arrays when running another species of lumber, for example.

As will be apparent to those skilled in the art, further operational and constructional variations can be adopted. Thus, by way of further example and not limitation, the counting or other unit measuring device can be of the light beam type, and in an accumulator section with conveyor discharge, like in FIG. 20, can be situated in the line of travel of the discharging units as they move from the accumulator rather than into the accumulator, it being apparent that in such an arrangement the necessity for any input transfer mechanism or interrupt mechanism (like platforms 274) is eliminated. Also, with regard to the arrangement of sorting arms, grade arm, and reject arm in a given sorting section, such sorting assembly can be arranged so as to be adjustable along the direction of travel of the lumber units through the sorting stage, to provide flexibility as to the point of drop of the lumber units relative to the accumulating area, in a manner functionally comparable to the variance in drop point available by reversing the slope of platforms 274 in the arrangement illustrated in FIG. 20.

From the foregoing various forms, constructional details and modes of operation of the sorter stages, transfer mechanisms and accumulator mechanisms typically characteristic of the invention, various other and further forms, arrangements, alternatives and adaptations as to component and section detail, stage layout and modes of operation for practicing the invention will occur to those skilled in the art, within the scope of the following claims.

What is claimed is:

1. The method of sorting lumber, comprising arranging spaced lumber units horizontally on underslung, rearwardly open hangers, moving the units so arranged edgewise along a path of travel, placing superposed selector hooks in intersecting position along said path of travel at a point of sort, and gauging a classification characteristic of each passing lumber unit by end position gauging means contactable by the lumber units when a lumber unit has a classification characteristic not to be selected at said point of sort, raising said gauging means by said contact with said lumber units and thereby raising and disabling said selector hooks.

2. The method of claim 1, comprising gauging the classification characteristic of length and grade by said end position gauging means.

3. The method of claim 1, further comprising gauging a width characteristic of the lumber units by configuring said selector hooks to interrupt the movement of said lumber units along said path of travel only when presented a lumber unit of a corresponding width characteristic.

4. A method of sorting lumber, comprising arranging spaced lumber units horizontally on underslung, rearwardly open hangers, moving the units so arranged edgewise along a path of travel, providing a series of points of sort along said path of travel, placing superposed selector means in intersecting position with said path of travel at each such point of sort, and gauging a classification characteristic of each passing lumber unit at each point of sort by unit end position gauging means contactable by the lumber units when a unit has a classification characteristic other than that allocated to said point of sort, raising each said gauging means by said contact of said lumber units and thereby raising and disabling the associated selector means.

5. The method according to claim 4, further comprising discharging lumber units selected at each point of sort to an associated accumulator.

6. The method according to claim 5, further comprising arranging the accumulators in line on common transfer means, segregating partial sorts of lumber units of one species from partial sorts of lumber units of another species by allocating alternate accumulators to selection of a first species of lumber units and allocating other alternate accumulators to collection of another species of lumber unit, and simultaneously moving all such accumulators to place all accumulators designated for collection of a given species of lumber units in alinement with the respective unit deliveries from the points of sort, such movement also simultaneously placing all accumulators designated for another species of lumber units out of alinement with the unit deliveries from said points of sort.

7. The method of handling sorted lumber units delivered by classification at various points of discharge from a lumber sorting mechanism to a series of accumulators and maintaining separation of units of one species from units of another species of lumber, said method comprising arranging a series of accumulators in line on common transfer means, and segregating partial sorts of lumber units of one species from partial sorts of lumber units of another species by allocating alternate in line accumulators to selection of a first species of lumber units and allocating other alternate in line accumulators to collection of another species of lumber units, and simultaneously moving all such accumulators by actuation of such common transfer means to place all accumulators designated for collection of a given species of lumber units in alinement with the respective unit discharges from the sorting mechanism, such simultaneous movement also simultaneously placing all accumulators designated for another species of lumber units out of alinement with the unit discharges from said points of sort.

8. The method of operating lumber sorting and accumulating mechanism wherein a sorting stage delivers sorted lumber units to a number of accumulators at spaced discharge points, comprising maintaining lumber units of the various sorted classifications segregated as to species by arranging at least some of said accumulators in line on common transfer means and assigning such alined accumulators alternately as to the species presented, and simultaneously moving the accumulators designated for a given species of lumber units in alinement with the respective discharge points from the sorter stage, such movement also simultaneously placing the accumulators designated for another species of lumber units out of alinement with the said respective discharge points.

9. In a sawn lumber unit sorting mechanism wherein a series of sorter sections are arranged to each select lumber units of a given classification, the arrangement of unit selecting means in each sorter section comprising a laterally spaced set of sorting arms mounted on a common pivot shaft for pivotal movement from a normal position in the path of travel of lumber units delivered to the sorting section and to a relatively raised, disabled position when encountered by a lumber unit in the sorting section, and sorting arm disabling means also mounted on said common pivot shaft and arranged to be raised by a lumber unit in the sorting section and in turn raise and disable the associated sorting arms when the lumber unit has a classification characteristic not to be selected in the sorting section.

10. In a sorting mechanism for elongated units of various dimensions, wherein such units are segregated at one of various sorting sections by type, endless conveyor means coursing the sorting mechanism and having arranged in spaced sets thereon laterally disposed sets of depending, rearwardly open hanger elements by means of which said units are individually conveyed in spaced relation edgewise along a path of travel with the width dimension thereof horizontal, a laterally disposed set of sorting arms pivotally mounted in superposed position so as to normally intersect said line of travel, the said sorting arms being mounted on a common pivot shaft, the unit contacting surfaces of said sorting arms being cut away to permit said sorting arms to nest on lumber units of not more than a predetermined width dimension and cause removal of such lumber units from the associated hanger elements except when the sorting arms are raised by rotation of said pivot shaft.

11. The combination of claim 10, further comprising sorting arm disabling means including a grade arm also mounted on said pivot shaft in a position to yieldably intersect the line of travel of said lumber units, said grade arm being disposed laterally at one side of said set of sorting arms, the arrangement of said grade arm and said sorting arms together on said pivot shaft providing that whenever a lumber unit encounters and lifts said grade arm, then said grade arm lifts and disables said sorting arms, the said sorting arms thereby being in position for nesting the cut away portions thereof on a lumber unit in the sorting station only when said grade arm is not lifted by the lumber unit.

12. Mechanism according to claim 10, further including, in combination with spaced sets of such sorter arms to provide a series of sorter sections, grade arms each keyed to the common pivot shaft with the associated set of sorter arms in each sorter section and disposed at various lateral positions with respect to the path of travel of said units, the said grade arms functioning to lift the set of sorter arms associated therewith from contact with a given lumber unit when said grade arm contacts the lumber unit, and the said set of sorter arms being thereby rendered operative for removal of the lumber unit from a set of hangers only when the associated grade arm is not contacted by the lumber unit.

13. Mechanism according to claim 10, further comprising, in combination with spaced sets of such sorter arms, a series of reject arms alined in the direction of movement of the lumber unit through the mechanism, each of said reject arms being associated with a set of sorter arms in the makeup of a sorter section and disposed to float in superposed contact with any lumber unit moved laterally to a predetermined reject position, each of said reject arms situated on the associated common pivot shaft also mounting set of sorting arms and functioning to disable said set of sorting arms whenever said reject arm is raised by a lumber unit.

14. Sorting mechanism according to claim 12, wherein at least some of the sorting sections are provided with an array of sorting arms and grade arms at one side of the path of travel of the lumber units, the arrangement providing that the operative grade arm and sorting arm in one end area of the lumber units passing through the sorting mechanism can be shifted from one assigned set to another assigned set upon assignment of that sorting section to another unit classification.

15. Sorting mechanism according to claim 14, wherein the sorting arms and grade arms making up such array each comprises a bar holder keyed to said common pivot shaft, and includes a unit engaging bar mounted in said holder and extending when in normal operative position intersecting the said path of travel, said bar holder also having extending therefrom counterweight means counterbalancing the most but not all of the weight of said unit engaging bar.

16. Sorting mechanism according to claim 15, further comprising means pivotally mounting each said unit engaging bar on the associated bar holder, pull pin means on each bar holder, and spaced apertures in said bar selectively engageable by said pin to place and maintain said bar either in operative position in said lumber unit path of travel or in inoperative position out of said path of travel.

17. In a lumber sorting mechanism wherein lumber units are segregated at one of various sorting sections by classification, endless conveyor means conveying spaced lumber units edgewise along a path of travel with the width dimension thereof disposed horizontally, a series of sorting sections along said path of travel, unit selector means and unit actuated disabling means mounting on a common pivot shaft in each sorting section, such disabling means when contacted by a lumber unit rendering the selector means in the sorting section ineffective to remove a lumber unit from said path of travel when the end of the lumber unit is at a lateral position indicative of a classification characteristic not to be selected in said sorting section, said selector means and disabling means being arranged in multiple array in said sorting section at various positions on said pivot shaft so that selected elements of the selector means and disabling means can be placed in operative position in said path of travel and the remaining selector means and disabling means of the array can be established in inoperative position.

18. Sorting mechanism for segregating units of sawn lumber and the like delivered thereto in random sequence as to dimension and grade, said mechanism comprising endless conveyor means, a series of laterally arranged sets of lumber carrying hangers on said conveyor means, said hangers being arranged on said conveyor means so as to present depending substantially horizontal lumber supporting surfaces and a rearwardly open configuration when said hangers are coursing the lower path of travel of said conveyor means, and sorting means comprising variously disposed sets of sorting arms, arranged at operationally fixed points of sort and relatively above the lumber supporting surfaces of said lumber carrying hangers, each such sorting arm being mounted for pivotal movement and balanced to float in superposed contact with lumber units carried by said hangers, each of said sorting arms having a recessed area in the lumber contacting surface thereof partly defined by a hook and dimensioned to span and nest over a lumber unit of a particular width, the said hook with the sorting arm in such nesting position serving to latch onto the lumber unit and remove it from hanger supported position.

19. In a sorting mechanism for segregating sawn lumber units delivered thereto in random sequence as to dimensional type, conveying means including rearwardly open, depending hangers on which lumber units rest with the width dimension thereof horizontal, a series of sorting stations arranged along said conveying means, each having a disabling arm disposed at a predetermined lateral point in each sorting section and keyed to a laterally disposed pivot shaft, and a laterally spaced set of sorting arms on each such pivot shaft, the said disabling arm and sorting arms being disposed above and yieldably positioned in the line of travel of lumber units coursing the sorting sections, the said disabling arm functioning through the associated pivot shaft in each instance to lift the associated set of sorting arms from contact with a given lumber unit when said disabling arm is contacted by the lumber unit, the said set of sorting arms being thereby rendered operative for removal of a lumber from the unit conveying means only when the associated grade arm is not contacted and lifted by a lumber unit.

20. Lumber sorting mechanism for segregating units of sawn lumber delivered thereto in random sequence as to dimension and grade, said mechanism comprising unit delivery means including a grade positioning deck wherein units are offset a grade related extent laterally of the general direction of travel of the units, a sorter stage including endless conveyor means, a series of laterally arranged sets of lumber carrying hangers depending from said conveyor means, said hangers being arranged on said conveyor means so as to present substantially horizontal lumber supporting surfaces and a rearwardly open configuration when said hangers are coursing the lower path of travel of said conveyor means, conveyor means depositing units on said hangers, and sorting means coursed by said hangers and comprising variously disposed sets of sorting arms pivotally movable at operationally fixed points above the lumber supporting surfaces of said lumber carrying hangers, each such sorting arm being mounted for pivotal movement and balanced to float in superposed contact with lumber units carried by said hangers, each of said sorting arms having a recessed area in the lumber contacting surface thereof partly defined by a hook and dimensioned to span a lumber unit of a particular width to drop down on and nest over same, the said hook with the sorting arm in such nesting position serving to latch onto the lumber unit and remove it from supported position on its set of hangers, said sorting means further comprising a series of grade arms, positioned laterally of the path of travel of said units through the sorting means at positions to gauge the length dimension and the extent of lateral offset of the units occasioned in said grade positioning deck, and to raise and disable the associated sorting arms unless a unit is of a particular length dimension and grade.

21. Lumber sorting apparatus according to claim 20, wherein each said grade arm is keyed in fixed position on a pivot shaft and each said sorting arm is keyed on said pivot shaft by an arrangement including a lost motion key receiving slot permitting limited pivotal movement thereon, such keying arrangement of said sorting arms providing that whenever the grade arm is lifted the sorting arms are also lifted but whenever the sorting arms are lifted without positive lift of the said grade arm or the said reject arm, then limited movement of said sorting arms can occur before movement of said pivot shaft occurs, such manner of keying of said sorting arms to said pivot shaft permitting a limited degree of independent movement of said sorting arms in the event one end of a given oncoming lumber unit is slightly ahead of its other end.

22. A lumber unit sorting apparatus comprising an endless conveyor means with depending, rearwardly open, lumber unit supports for carrying side supported lumber units in spaced relation along a path of travel, a sorting section along said path of travel for selecting a lumber unit of a particular classification, and lumber unit selecting means in said sorting section comprising a pivot shaft, unit selector means on said pivot shaft and disposed to normally lie in said path of travel, and unit actuated disabling means also mounted on said pivot shaft and disposed to be contacted and lifted by a lumber unit except when the end of the lumber unit is at a lateral position indicative of a classification characteristic to be selected in said sorting section.

23. Sorter mechanism according to claim 22, wherein said unit selecting means includes a sorting arm comprising counterweight means at one side of said pivot shaft and a sorting bar at the other side of said pivot shaft, said sorting bar being disposed to place the free end thereof in a substantially horizontal disposition normally in the path of travel of said lumber units, said free end portion of said sorting bar having a lumber contacting face including a skid first encountering and riding up over the lumber unit, and a trailing hook portion at the outer end of the sorting bar, a recess area being provided between said skid and said hook portion to permit the sorting bar to nest over a lumber unit of not more than a predetermined width, the said hook portion with the bar in such nesting position serving to latch onto the lumber unit and remove the lumber unit from the conveyor means when the lumber unit is to be selected.

24. Lumber unit sorting mechanism according to claim 22, wherein said unit actuated disabling means is a grade arm positioned to be responsive to a grade related position of certain of the lumber units on said conveyor means.

25. Lumber unit sorting mechanism according to claim 22, wherein said unit actuated disabling means is a reject arm positioned to be responsive to any lumber unit having a reject related position on said conveyor means.

26. A lumber unit sorting apparatus comprising an endless conveyor means with depending, rearwardly open, lumber unit supporting hangers for carrying spaced, side supported lumber units in aligned width succession and edge first along a path of travel, a series of sorting sections along said path of travel for selecting lumber units of particular classifications, and lumber unit selecting means in said sorting sections arranged to select lumber units of narrower width before wider widths in sequence for a given length and to select shorter lengths before longer lengths, each such lumber unit selecting means comprising a rocker shaft across and slightly above said path of travel of the lumber units, unit selector hooks on said rocker shaft normally disposed to engage and remove a lumber unit from its supporting hangers, and lumber unit actuated disabling means also mounted on said rocker shaft and disposed to be contacted and lifted by a lumber unit if the lumber unit has a classification characteristic not to be selected in the sorting section, the said disabling means acting through said rocker shaft to lift said selector means out of said path of travel whenever in turn lifted by a lumber unit.

27. A lumber sorting apparatus according to claim 26, wherein said disabling means comprises a series of reject arms alined in the direction of travel of the lumber units, one in each sorting station, the lumber sorting apparatus further comprising lumber unit delivering infeed means including a stage wherein lumber units of reject grade are moved endwise to an extent to cause any lumber unit thus moved to successively lift each of the reject arms, a lumber unit of reject grade thereby being not selected by any of the selector hooks.

28. A mechanism for sorting and accumulating elongated lumber units of various classifications wherein such units are segregated at one of various sorting sections by dimensional type and by species, a sorting stage, endless conveyor means coursing the sorting stage and having arranged in spaced sets thereon laterally disposed sets of depending rearwardly open hanger elements by means of which said units are individually conveyed edgewise in spaced and aligned relation along a path of travel, a series of sorting stations along said path of travel, a laterally disposed set of selector means at each sorting station, pivotally mounted in superposed position therein so as to normally intersect said path of travel, the said sorting stations further including unit actuated disabling means for raising and thereby disabling said sorting selector means except when a unit having a given classification characteristic is in the sorting station, said sorting and accumulating mechanism further including transfer means associated with each sorting station for delivering units discharged at each sorting station to separated discharge areas, a series of accumulators at said discharge areas, each for receiving a number of lumber units of a predetermined classification, the said accumulators being arranged in line alternately as to species of units to be accumulated therein, said discharge areas being aligned above alternate accumulators, and accumulator transfer means common to several of such accumulators for simultaneously moving all such accumulators to place all accumulators designated for a given species at said discharge areas, such accumulator transfer means simultaneously placing the alternate accumulators designated for reception of another species of units out said discharge areas.

29. In combination with sawn lumber unit sorting mechanism having spaced, aligned discharge points, means accumulating lumber units of various segregated classifications, including a series of accumulator means, each for storing units of an assigned type and species, the arrangement of accumulator means being with accumulator means alternately allocated as to different species of lumber units, said discharge points being disposed above alternate accumulators, said accumulator means being mounted in line on common transfer means for simultaneous movement as a set, and means for simultaneously moving all such accumulator means to place all accumulator means designated for a given species in alinement with the respective discharge points of the associated sorting mechanism, such movement simultaneously placing all accumulators designated for another species out of alinement with the said respective discharge points.

30. Lumber accumulating mechanism including spaced, aligned discharge points, a series of receptacles for receiving a number of lumber units of a predetermined size, grade and species, said receptacles being arranged in line alternately as to species and said discharge points being disposed above alternate receptacles, and means for conjunctively moving all such receptacles to place all receptacles designated for a given species in alinement with the respective discharge points of the sorter section of the mechanism and also conjunctively placing all receptacles designated for another species out of alinement with the said respective discharge means.

31. Mechanism for accumulating lumber units of various classifications and species wherein such units are segregated as to classification at one of various sorting sections and delivered to separated discharge areas each at a fixed location, a first set of accumulators at said fixed locations each for receiving a number of lumber units of a predetermined classification, a second set of accumulators in between said fixed locations, with the said first and second sets of accumulators being interarranged in line alternately as to species of units to be accumulated therein, and accumulator transfer means common to several of such in line accumulators for conjunctively moving all such accumulators to place all accumulators designated for a given species at said fixed locations, such accumulator transfer means conjunctively placing the alternate accumulators designated for reception of another species of units out of alignment with said fixed locations.

32. A lumber unit sorting apparatus comprising an endless conveyor means with depending, rearwardly open, lumber unit supporting hangers for carrying side supported lumber units in spaced relation and edge first along a path of travel, a sorting section along said path of travel for selecting lumber units of a predetermined width, and lumber unit selecting means in said sorting section including sorting arm means mounted for pivotal movement from a normal position in the path of travel of lumber units delivered to the sorting section and to a relatively raised, disabled position when encountered by a lumber unit, said sorting arm means having portions configured to selectively nest upon and engage and remove lumber units of said predetermined width from their respective supporting hangers.

33. A lumber unit sorting apparatus comprising an endless conveyor means with depending, rearwardly open, lumber unit supporting hangers for carrying side supported lumber units in spaced relation and edge first along a path of travel, a series of sorting sections along said path of travel for selecting lumber units of a particular classification, and lumber unit selecting means in said sorting sections arranged to select lumber units of narrow width before wider width in sequence for a given length and to select shorter lengths before longer lengths, each such lumber unit selecting means including sorting arm means normally disposed within the path of travel of the lumber units and having hooked portions which engage the leading edge of and remove lumber units of a predetermined width of said particular classification from their respective supporting hangers, said hooked portions being raised by the lumber unit to a non-engaging position when a lumber unit having a width greater than the predetermined width strikes the sorting arm means.

34. In a lumber sorting mechanism comprising a series of sorting sections, a lumber unit conveying means transporting lumber units successively edge first through said sorting sections along a predetermined path of travel, lumber width gauging means contacted by said lumber units when moving in said path of travel, and lumber discharging means for selectively removing a given unit from said conveying means when of a predetermined width; the said conveying means including rearwardly open hanger elements supporting said units during movement thereof through the sorting stations, and the said width gauging and lumber discharging means in each sorting station comprising a set of sorting arms pivotally mounted above said unit path of travel and each having the configuration in the portion extending in the unit path of travel which includes a unit contacting skid, a hook, and a recess between said skid and hook, whereby the sorting arm can be pivotally raised by the skid contacting the lumber units, and can then pivotally drop to nest the lumber unit in said recess when the unit width is less than the length of said recess, with said hook thereupon arresting the movement of the lumber unit, and disengaging and discharging the lumber unit from said hanger elements.

35. In a lumber sorting mechanism comprising a series of sorting sections, a lumber unit conveying means transporting lumber units successively edge-first through said sorting sections along a predetermined path of travel, lumber width gauging means contacted by said lumber units when moving in said path of travel, lumber discharging means for selectively removing a given unit of lumber from said conveying means when of a predetermined width; the said conveying means including rearwardly open hanger elements supporting said units during movement thereof through the sorting stations, and the said width gauging and lumber discharging means in each sorting station comprising a set of sorting arms pivotally mounted above said unit path of travel and each having a configuration in the portion extending in the unit path of travel which includes a unit contacting skid, a hook, and a recess between said skid and said hook, whereby the sorting arm can be pivotally raised by the skid contacting lumber unit, and can then pivotally drop to nest the lumber unit in said recess when the unit width is less than the length of said recess, with said hook thereupon arresting the movement of the lumber unit, and disengaging and discharging the lumber unit from said hanger element, and associated lift means including a lift element connected to the sorting arms and arranged to detect the unit end position and to lift said sorting arms to a disabled position above the path of travel of said lumber units whenever contacted by a lumber unit.

36. A lumber unit sorting apparatus comprising an endless conveyor means with depending, rearwardly open, lumber units supporting hangers for carrying side supported lumber units in a spaced relation and edge first along a path of travel, a series of sorting sections along said path of travel for selecting lumber units of particular classification, sorting elements in each section superposed on said path of travel of the lumber units and configured to select and remove units of a predetermined width from their respective supporting hangers, and an associated lift element connected to the sorting elements of each sorting section and arranged to detect unit end position and to lift said sorting elements to a disabled position above said path of travel of said lumber units whenever contacted by a lumber unit.

37. A lumber unit sorting apparatus comprising an endless conveyor means with depending, rearwardly open, lumber unit supporting hangers for carrying side supported lumber units in spaced relation and edge first along a path of travel, a series of sorting sections along said path of travel for selecting lumber units of particular classification, and lumber unit selecting means in said sorting sections arranged to select lumber units of narrow width before wider width in sequence for a given length and to select shorter lengths before longer lengths, each such lumber unit selecting means including sorting elements superposed on said path of travel of said lumber units, said sorting elements having hooked portions which engage the leading edge of and remove lumber units of a predetermined width from their respective supporting hangers, said hooked portions being raised by the lumber unit to a non-engaging position when a lumber unit having a width greater than the predetermined width strikes the sorting arm means, and an associated lift element connected to the sorting elements of each sorting section and arranged to detect unit end position and to lift said sorting elements to a disabled position above said path of travel of said lumber units whenever contacted by a lumber unit.

38. In combination with sawn lumber unit sorting mechanism having spaced, moving sets of lumber unit supporting hanger elements rearwardly open with respect to the direction of travel thereof, means for delivering a single lumber unit to each set of said hanger elements including infeed conveyor and spacer stage means delivering units edge first and in spaced relation to a fast infeed conveyor stage, said fast infeed conveyor stage including slick-chain conveyor means end positioned to receive spaced lumber units from said infeed conveyor and spacer stage means and having an offbearing end portion positioned to deliver the spaced lumber units onto the hanger elements and a lumber supporting surface at substantially the same level as the lumber unit supporting surface portions of the hanger elements, such lumber supporting surface of the slick-chain conveyor means overlapping the path of travel of said lumber unit supporting surface portion of the hanger elements at the offbearing end portion of the conveyor means, and means driving said slick-chain conveyor means substantially faster than said hanger elements of said sorting mechanism and at a speed such that the unit supporting surface of said slick-chain conveyor means can overrun a lumber unit when delivered to its associated hanger elements.

References Cited in the file of this patent

UNITED STATES PATENTS

| | | |
|---|---|---|
| 845,330 | Bowman | Feb. 26, 1907 |
| 964,670 | Moncreiffe | July 19, 1910 |
| 1,349,836 | Johanson | Aug. 17, 1920 |
| 1,706,632 | Onstad | Mar. 26, 1929 |
| 2,305,816 | Sonnberger | Dec. 22, 1942 |
| 2,902,150 | Rambo | Sept. 1, 1959 |
| 3,006,468 | Blake | Oct. 31, 1961 |

FOREIGN PATENTS

| | | |
|---|---|---|
| 1,196,115 | France | May 25, 1959 |